UNITED STATES PATENT OFFICE.

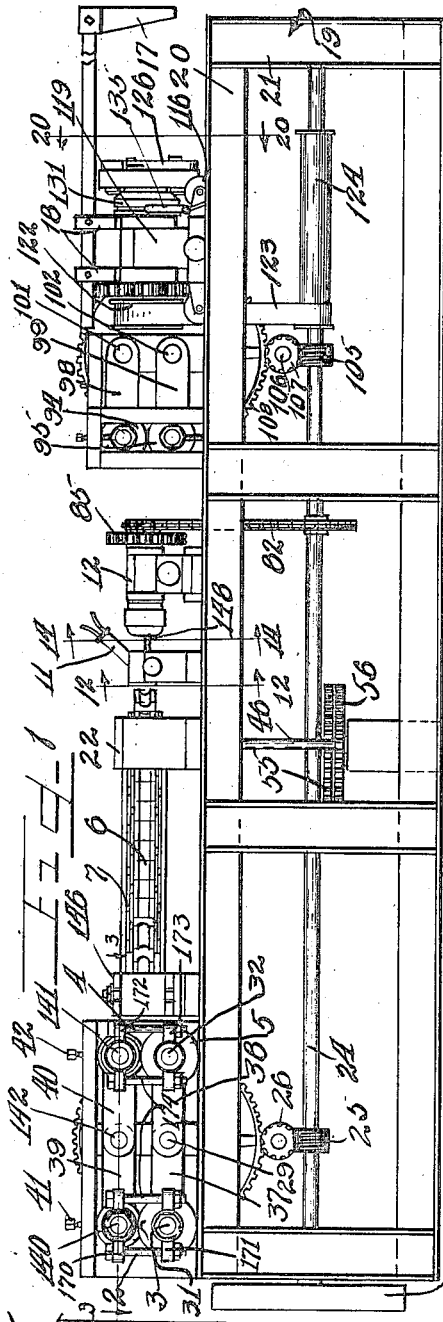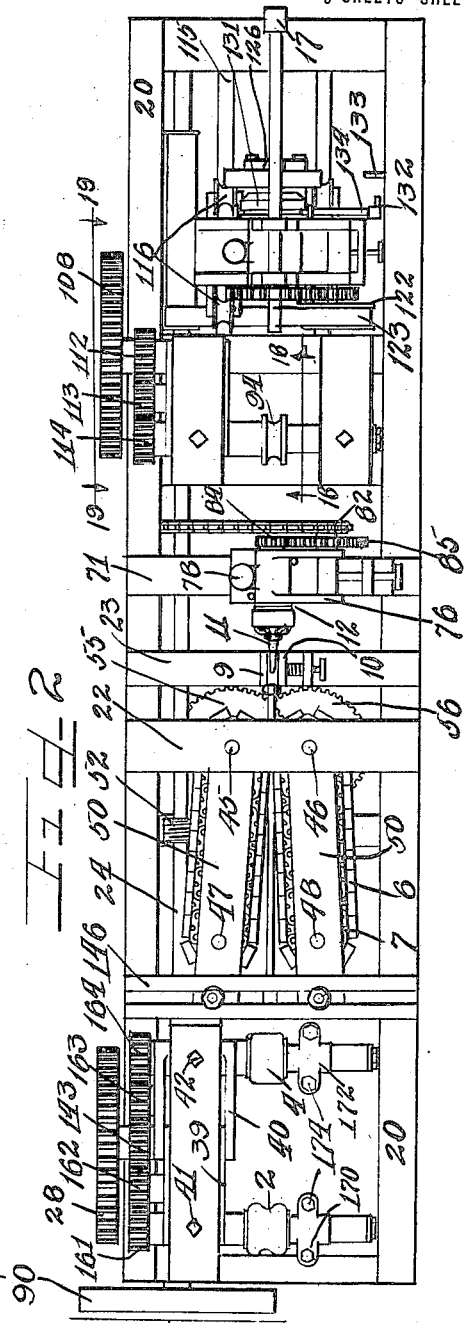

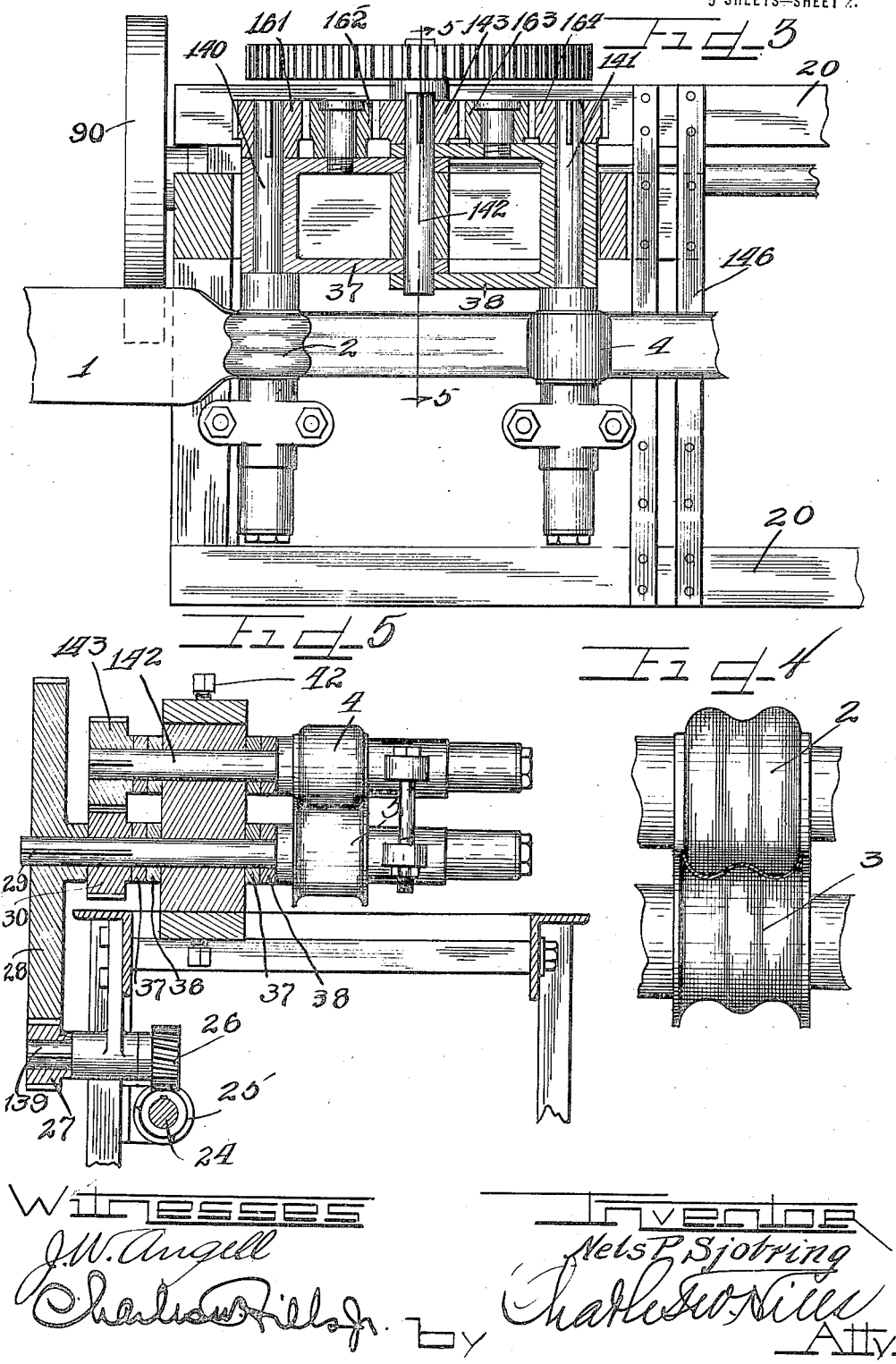

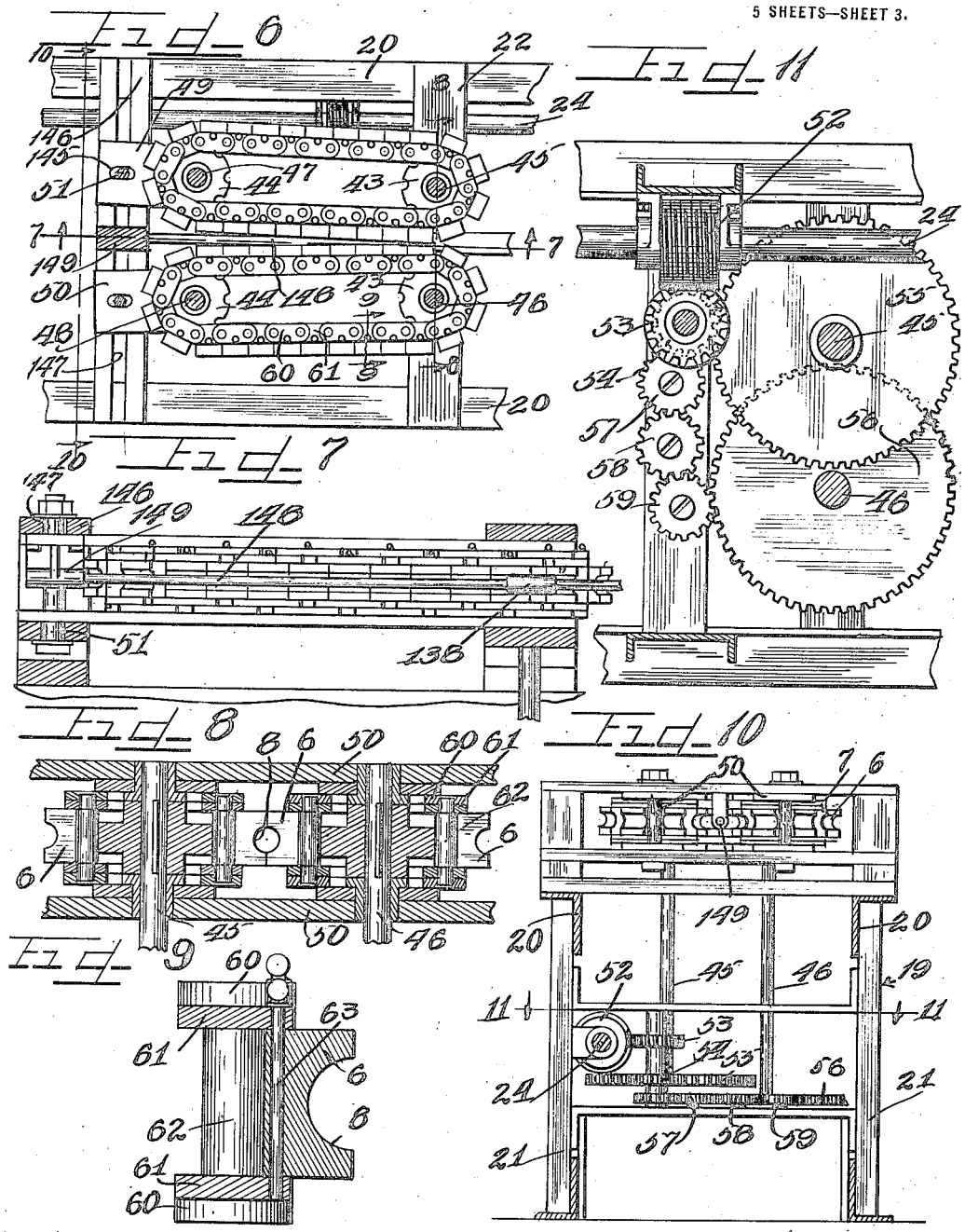

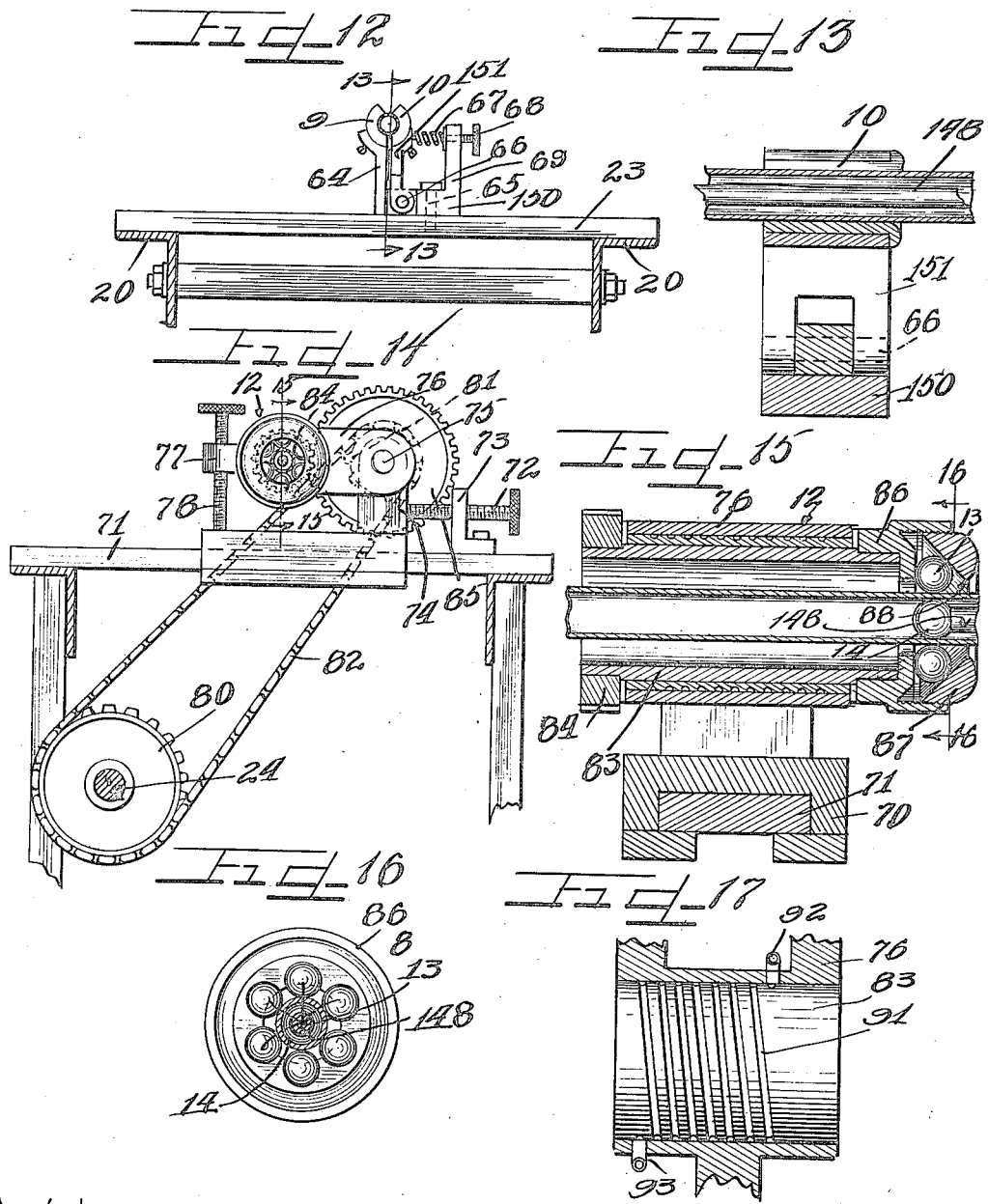

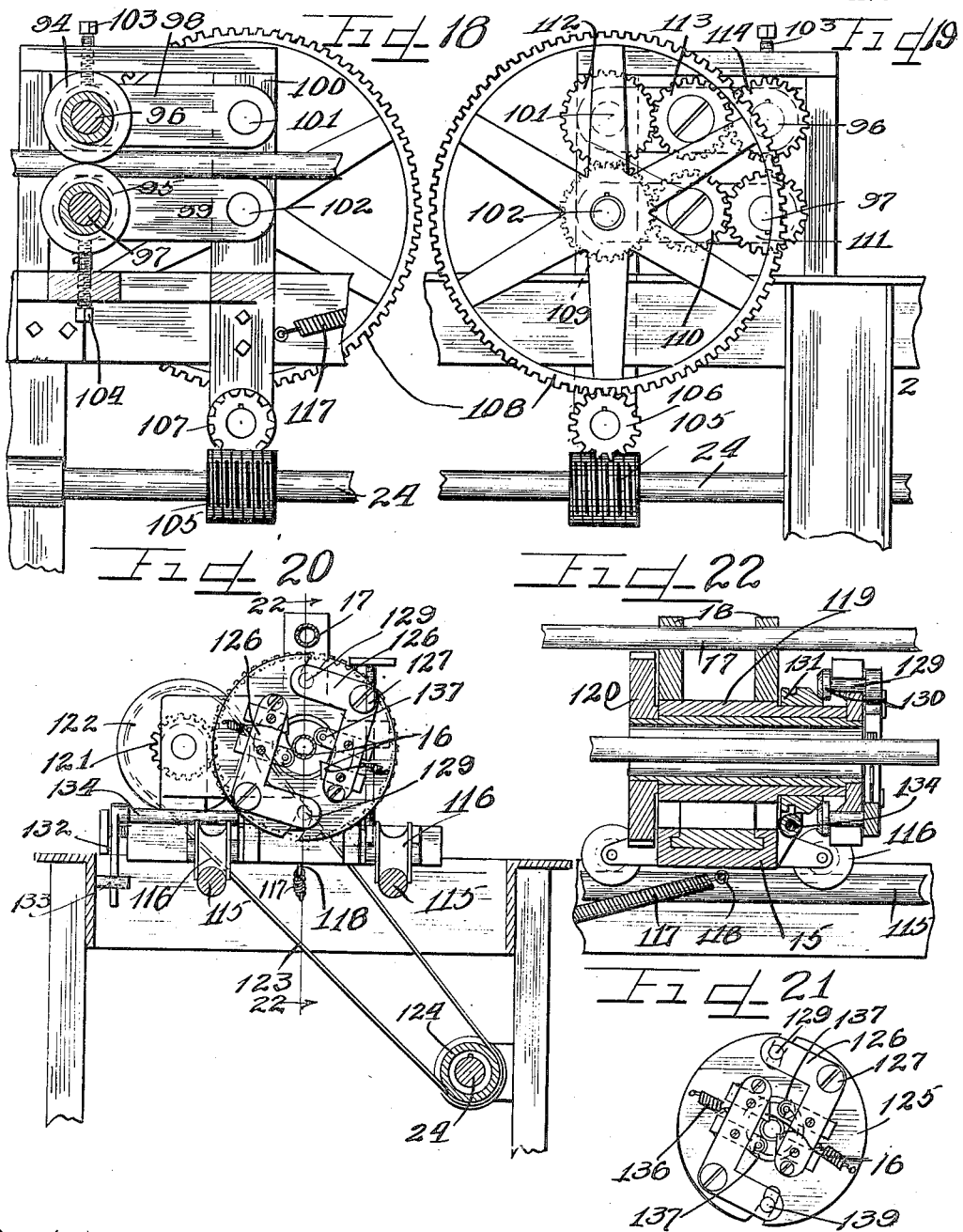

NELS P. SJOBRING, OF CHICAGO, ILLINOIS.

PROCESS AND APPARATUS FOR MANUFACTURE OF PIPES.

1,404,830.      Specification of Letters Patent.      Patented Jan. 31, 1922.

Application filed March 10, 1919. Serial No. 281,811.

*To all whom it may concern:*

Be it known that I, NELS P. SJOBRING, a citizen of the United States, and a resident of the city of Chicago, in the county of Cook and State of Illinois, have invented certain new and useful Improvements in Processes and Apparatus for Manufacture of Pipes; and I do hereby declare that the following is a full, clear, and exact description of the same, reference being had to the accompanying drawings, and to the numerals of reference marked thereon, which form a part of this specification.

My invention relates to the manufacture of pipes from a strip of sheet metal and more particularly to the manufacture of welded or so-called seamless pipes in which the joint is made by welding together the edges of the strip as distinguished from soldering or brazing.

Hitherto, in the manufacture of such pipe, the joint has been insufficiently smoothed so as to remove any inequalities therein.

Further, the methods heretofore employed for bending the strip into tubular form prior to welding have not been altogether satisfactory.

My invention is designed to obviate these troubles.

It is an object, therefore, of my invention to provide an improved process and apparatus for making pipe from a strip of metal.

A further object of my invention is the provision of improved means for bending a metallic strip into circular form.

It is also an object of my invention to provide means for smoothing the welded joints both internally and externally.

Further it is an object of my invention to provide improved means for cutting the finished pipe into lengths as desired.

My invention also has other important objects, which will appear from the disclosures in the specification and drawings.

The invention (in a preferred form) is illustrated in the drawings and hereinafter more fully described.

On the drawings:

Figure 1 is a side elevation of a machine embodying my invention.

Figure 2 is a plan view of the same.

Figure 3 is a section on the line 3—3 of Figure 1.

Figure 4 is a side view of the front pair of rolls.

Figure 5 is a section on the line 5—5 of Figure 3.

Figure 6 is a plan view of one part of the tube bending mechanism.

Figure 7 is a section on line 7—7 of Figure 6.

Figure 8 is a section on the line 8—8 of Figure 6.

Figure 9 is a section on the line 9—9 of Figure 6.

Figure 10 is a section on the line 10—10 of Figure 6.

Figure 11 is a section on the line 11—11 of Figure 10.

Figure 12 is a section on the line 12—12 of Figure 1.

Figure 13 is a section on the line 13—13 of Figure 12.

Figure 14 is a section on the line 14—14 of Figure 1.

Figure 15 is a section on the line 15—15 of Figure 14.

Figure 16 is a section on the line 16—16 of Figure 15.

Figure 17 is a horizontal central section through one of the parts shown in Figure 15.

Figure 18 is a section on the line 18—18 of Figure 2, with parts removed.

Figure 19 is a view taken on the line 19—19 of Figure 2.

Figure 20 is a section on the line 20—20 of Figure 1.

Figure 21 is a detail view of the pipe cutting mechanism.

Figure 22 is a section on the line 22—22 of Figure 20.

As shown on the drawings:

A strip of metal 1, is fed into the machine at a uniform rate from any convenient source, such as a reel or the like, not shown. The strip passes first between a pair of rolls 2, and 3, adapted to give the strip the double trough form shown in Figure 4, in which the cross-section of each half of the trough is substantially a semi-circle having approximately same radius of curvature as that of the finished pipe. The strip then passes through a second set of rolls 4 and 5, to flatten out the central rib as shown in Figure 5. The edges of the strip are then brought together until they meet around a mandrel 138, by means of series of blocks 6 carried by the chains 7. These blocks 6 are provided with semi-circular grooves 8, in their outer faces of substantially the same radius as the outside of the completed pipe. The chains 7 are arranged to converge at their farther ends to bring the opposing blocks 6 substantially in contact with each other. The strip on leaving this series of blocks has been given the desired circular form and is ready for the welding operation. The welding may be performed by any suitable means such as an oxy-acetylene torch 11. The edges of the strip are held together while being welded by the torch by means of two guide blocks 9 and 10, arranged to press resiliently on the opposite sides of the tube as shown in Figure 12. After the tube has been welded it is smoothed both internally and externally by suitable means, such as the device 12. In this device means are provided for pressing a series of balls 13 against the outer face of the pipe and simultaneously producing relative rotation of the balls and the pipe. The inside of the pipe is conveniently smoothed simultaneously by the spherical end 14 of a mandrel arranged within the pipe. The pipe then passes between a further pair of rolls 94—95 to a suitable cutting mechanism which cuts the pipe into the desired lengths. This mechanism includes a carriage 15 adapted to move with the pipe a short distance along the frame of the machine during the cutting operation. The pipe normally passes freely through the cutting device until it strikes a stop 17, adjustably attached at 18 to the carriage so that when the pipe strikes the stop 17, it carries the carriage with it. This movement of the carriage causes cutters 16, carried thereby to engage and cut the pipe. As soon as this has been accomplished, the length of pipe cut off drops out of contact with the stop 17, so that the latter with the carriage 15 is free to return to its original position on the frame under the action of a spring 117. The frame 19 comprises a pair of longitudinal side beams 20, supported by vertical columns 21 and connected by a series of cross beams 22, 23, etc. The machine is driven from a main shaft 24, journaled in the lower part of the frame and provided with a driving pulley 90, connected by a belt to a suitable source of power.

The rolls 2, 3, 4 and 5 are mounted in frames 39, 37, 40 and 38 respectively, all independently pivotally connected to the main frame 19, so that the vertical position of each roll may be varied with relation to any other roll by set screws as 41, 42. The lower pair of frames 37 and 38 turn about the shaft 29, while the upper pair of frames 39 and 40 turn about the shaft 142 as a pivot.

The outer ends of the shafts carrying each of the rolls 2, 3 and 4, 5, are mounted in bearings 170, 171, 172 and 173, adjustably connected in pairs by bolts 174 or the like.

The rolls are all driven from the main shaft 24 by a train of gearing including gears on the shafts 29 and 142, which enable the position of the rolls to be adjusted without interfering with the driving mechanism. As the main shaft 24 is driven at a much higher speed than the rolls 2, 3, 4 and 5, means for reducing the speed are provided. For this purpose a worm 25 is arranged on the shaft 24 to engage a worm wheel 26 on the shaft 139. The latter shaft also carries a pinion 27 in mesh with a gear 28 on the shaft 29. On the same shaft 29 is mounted a pinion 30 driving a pinion 143 on the shaft 142. Pinions not shown are arranged on the shafts 31 and 32 for the lower pair of rolls and these are connected to the pinion 30 by idle pinions. Similar pinions 161, 162, 163 and 164 connect the pinion 143 on the shaft 142 to the shafts 140 and 141, which carry the upper pair of rolls 2 and 4.

The rolls 2, 3, 4 and 5 give the strip the trough form shown in Figure 5, and the next step in the process is to curve the edges upwardly and inwardly around the mandrel 138 to give the strip the desired cylindrical form. This is accomplished by two series of shaping blocks 6 carried by chains 7. These chains are carried by sprockets 43 and 44, and means are provided for adjusting the horizontal position of the sprockets 44. For this purpose frames 49, 50 are provided in which the shafts 47 and 48, which carry the sprockets 44, are journaled. These frames are arranged to swing horizontally about the shafts 45 and 46, which carry the sprockets 43, as pivots and are locked in position by bolts 51 passing through slots 147 in beam 146 carried by the main frame and also through slots 145 in the ends of the frames 49, 50.

The cylindrical mandrel 138 is formed on a rod 148, attached to a bracket 149 secured to the underside of the beam 146.

The chains 7, comprise overlapping links 60 and 61, connected by pintles 62. The blocks 6, which contact with the metal strip to bring it into circular form, are secured to the links of the chain by means of pins 63, so that one set of blocks may be changed for another set adapted to form a pipe of different size.

The chains 7 are driven from the main shaft 24 through the shafts 45 and 46 by the train of gears shown in Figure 11. A worm 52 on the shaft 24 drives a worm wheel 53 having rigidly connected thereto a pinion 54. This pinion drives the gear 55 on the sprocket shaft 45 and is also operatively connected to the gear 56 on the other sprocket shaft 46 by the pinions 57, 58 and 59.

After the strip has been bent into circular form it is ready for welding. It is necessary, however, to hold the edges of the strip together during the welding operation. This is conveniently accomplished by providing a bracket 150 slidably mounted on a transverse member 23 of the main frame and secured in the desired position thereon by a clamping screw 65. To one end of this bracket is secured an upstanding arm 64, carrying at its upper end the guide block 9. The opposite guide block 10 is mounted on the upper end of an arm 151, pivotally secured to the frame 150 at 66, so that such guide block may be resiliently pressed towards the other guide block 9, so as to hold the edges of the strip always in contact. For this purpose a spring 67 is provided bearing at one end against the upper part of the arm 151 and at the other end against a set screw 68, mounted in an arm 69 of the frame 150. The upper edges of the guide blocks 9 and 10 are cut away to provide a space for the welding torch 11.

The pipe after being welded now moves toward the smoothing device shown more particularly in Figures 14 to 17, inclusive. This smoothing device is mounted on a carriage 70, adapted to slide on one of the transverse beams 71 of the frame, its position thereon being controlled by an adjusting screw 72 passing through a bracket 73, rigidly connected to the cross beam 71. This carriage 70, is provided with an upstanding arm 74, in which is journaled a shaft 75, about which shaft a frame 76 carrying the smoothing device is adapted to turn. The angular position of the frame 76, relatively to the shaft 75, is controlled by means of a lug 77, having threaded engagement with an adjusting screw 78. It will be evident, therefore, that by adjusting one or other or both of the screws 72 and 78, the position of the smoothing device may be adjusted horizontally or vertically as desired.

The shaft 75 is driven at high speed from the main driving shaft 24, by means of the sprockets 80 and 81 and the chain 82. The use of a chain drive enables the position of the carriage 70 to be adjusted without interfering with the transmission of power thereto.

The smoothing device itself comprises a sleeve 83, journaled in the frame 76. At one end of the sleeve a gear 84 is provided adapted to be driven by the gear 85, on the shaft 75. At the other end of the sleeve 83, is a head 86, adapted to receive a series of balls 13. These balls are pressed toward the outer face of the pipe by means of a threaded annular ring 87, having a conical inner face 88, as shown in Figure 15, so that by screwing the ring into the head the balls may be pressed against the pipe by the conical face 88.

Within the pipe a spherical mandrel 14 is provided at the end of the rod 148, which also carries the cylindrical mandrel 138 above referred to. This mandrel is located so as to contact with the inner face of the pipe substantially opposite the line of contact of the balls 13 with the outer face of the pipe.

As the sleeve 83 rotates at high speed considerable heat is developed by the friction of the sleeve rotating in the frame 76, and also by the friction of the balls 13 against the pipe and the head 86 and ring 87, means for cooling the sleeve are preferably provided. This cooling may be conveniently carried out by providing a spiral groove 91 around the periphery of the sleeve 83, through which water may be passed. The frame 76, is provided with suitable connections 92 and 93 for the admission and discharge of the water passed through such groove.

The pipe then passes to a pair of rolls 94 and 95 for insuring that the pipe is of accurate cylindrical form when it leaves the machine. These rolls are provided with grooved surfaces of semi-circular form adapted to give the pipe the desired shape. The shafts 96 and 97 on which these rolls are mounted are journaled in frames 98 and 99, pivotally mounted on shafts 101 and 102, journaled in the frame 100. so that by adjusting the set screws 103 and 104, the position of the rolls 94 and 95 may be adjusted vertically independently of each other. The gearing for driving the rolls 94 and 95, is shown more particularly in Figure 19. The shaft 24 is provided with a worm 105, which drives the pinion 106, through the worm wheel 107. This pinion 106 is in mesh with a gear 108 on the shaft 102. The shaft 102 drives the roll 95 through the gears 109, 110, 111 and also drives the roll 94 through the gears 109, 112, 113 and 114.

The tube then passes through the cutting off device shown more particularly in Figures 20 to 22. The cutting off device comprises a carriage 15, adapted to run on rods 115 longitudinally arranged on the main frame 19 by means of wheels 116. Ordinarily the carriage is held in the position shown in Figure 1 by means of a spring 117, attached at 118, to the underside of the carriage 15.

The carriage 15 rotatably supports a sleeve 119, adapted to be rotated by a gear 120, in mesh with the pinion 121. This pinion is rigidly secured to a flanged pulley 122, connected by a flexible belt 123 to a flanged pulley 124 on main shaft 24. The distance between the flanges on the pulley 124 on the shaft 24 enables the carriage to slide to and fro on the frame without interfering with the transmission of power from the main shaft.

At the rear end of the sleeve 119, is arranged a plate 125, to which are pivotally secured bell crank levers 126 at 127. To one end of each of the bell crank levers is secured a cutter 16, adapted to engage and cut through the tube. To the opposite end of each bell crank lever a pin 129 is connected carrying a wheel 130, adapted to engage an annular cam 131. This cam is adapted to slide to and fro on the sleeve 119, and in so doing to move the wheel 130 and the pin 129 outwardly, thereby swinging the bell crank levers 126 about their pivots 127, so as to bring the cutters 16 in engagement with the pipe as shown in Figure 21. The cam 131 is moved on the sleeve by means of a finger 135, on a shaft 134, carrying a trip arm 132. This arm contacts with a stop 133 on the frame when the carriage 15 is moved along the frame by engagement of the end of the pipe with the stop 17. Springs 136 are preferably provided attached to the plate 125 and the bell crank levers 126, for holding the cutters out of engagement with the pipes, except when the cam 131 brings them into contact with the pipe. Means as 137 are also provided on the bell cranks for support of the pipe during the cutting operation.

I am aware that numerous details of construction may be varied through a wide range without departing from the principles of my invention as defined in the appended claims, and I therefore do not purpose limiting the patent granted otherwise than necessitated by the prior art.

I claim as my invention:

1. A process for making pipes comprising bending a strip of metal into double trough form, the cross section of each half of the strip being substantially a semi-circle of the same radius as that of the finished pipe, flattening the central ridge so formed, and then bringing the edges into juxtaposition and finally uniting such edges.

2. An apparatus for making a pipe from a strip of material comprising a mandrel having a circular portion of substantially the internal diameter of the finished pipe, a ball shaped portion having a diameter slightly larger than that of the circular portion, means connecting the ball shaped portion and the circular portion, means for bending the edges of the pipe into contact with each other around the circular portion, means for welding the edges together opposite the connecting means, and means for smoothing the welded joint by forcing it over the ball shaped portion.

3. An apparatus for making pipe from a strip of material comprising a mandrel having two circular portions of substantially the internal diameter of the finished pipe and an intermediate cut-away portion, means for bending the edges of the pipe into contact with each other around the first circular portion, means for welding the edges together opposite the cut-away portion, and means for smoothing the welded joint around the second circular portion.

4. A pipe making apparatus of the kind described comprising a frame, rolls carried thereby adapted to give a strip of metal a trough-shaped form, a pair of continuous conveyors, means for adjusting the distance between one end of said pair of conveyors, pipe forming means carried by the conveyors acting to bend the edges of the strip upwardly and inwardly to form a cylinder, and means for uniting such edges.

5. A process for making pipes comprising first bending the central portion of the strip into convex form, then bending the same portion into concave form to form a cylinder therefrom, and finally uniting the edges to form a pipe.

6. A process for making pipes comprising passing a strip between a series of exterior forming surfaces to give the strip the desired cylindrical form, such forming surfaces moving bodily with the strip thereby avoiding friction between the strip and the said surfaces.

7. A process for making pipes comprising passing a strip under a mandrel, folding the edges of the strip upwardly and inwardly around the mandrel by means moving bodily with the strip to produce a cylinder and then uniting the abutting edges.

8. A process for making pipes comprising bending a strip of metal into double trough form, the cross section of each half of the strip being substantially a semi-circle of the same radius as that of the finished pipe, flattening the central ridge so formed, passing the strip under a mandrel, folding the edges of the strip upwardly and inwardly around the mandrel to form a cylinder, welding the abutting edges together, passing the pipe so formed over a second mandrel to smooth the inner face of the joint, pressing a smoothing member against the outer face of the pipe opposite the point of contact of the mandrel with the inner face of the pipe and simultaneously rotating such member relatively to the latter and thereby smoothing the inner and outer faces of the joint.

9. A process for making pipes including bending a strip of metal into double trough form, flattening the central ridge so formed, moving the strip along with and between converging rows of dies and forming the strip around a mandrel as it leaves the dies, and finally uniting the edges of the strip.

10. In a pipe making apparatus of the kind described a plurality of pairs of rollers for forming the pipe metal, and means for adjusting each pair of rollers independently of the other pair or pairs.

11. A pipe making apparatus of the kind described comprising a frame, means carried thereby adapted to give a strip of metal a trough shaped form, a mandrel mounted on the frame, converging rows of pipe forming blocks adapted to move with the strip of metal and form it around the mandrel, and means for uniting the edges of the metal when formed.

12. A pipe making apparatus comprising a frame, rolls carried thereby adapted to give a strip of metal a trough shaped form, a pair of chains, pipe forming blocks carried by the chains adapted to bend the edges of the strip upwardly and inwardly to form a cylinder, and means for uniting such edges.

In testimony whereof I have hereunto subscribed my name in the presence of two subscribing witnesses.

NELS P. SJOBRING.

Witnesses:
LAWRENCE REIBSTEIN,
SPENCER W. GIBBS.